United States Patent [19]

Mukai et al.

[11] 4,034,830

[45] July 12, 1977

[54] LUBRICATING OIL PUMP

[75] Inventors: Osamu Mukai, Yokohama; Kokichi Fukuzawa, Yamato; Yoshiro Nagao, Chigasaki; Kenichi Kubota, Tokyo; Shigelu Kobayashi, Tokyo; Masakuni Shibuya, Tokyo, all of Japan

[73] Assignee: Mikuni Kogyo Kabushiki Kaisha, Tokyo, Japan

[21] Appl. No.: 598,389

[22] Filed: July 23, 1975

[30] Foreign Application Priority Data

July 29, 1974 Japan .......................... 49-90183[U]
Oct. 1, 1974 Japan ......................... 49-117727[U]
Oct. 1, 1974 Japan ......................... 49-117729[U]

[51] Int. Cl.² ........................................ F16N 13/04
[52] U.S. Cl. ...................... 184/27 R; 123/139 BD; 184/33
[58] Field of Search ............. 184/27 R, 27 A, 27 B, 184/27 C, 27 D, 27 E, 31, 32, 33, 34, 35, 7 D, 7 E, 7 F; 123/139 BD, 139 AC, 139 AR, 139 AD, 139 AE, 139 BC, 139 BE, 196 CP

[56] References Cited

U.S. PATENT DOCUMENTS 878,073  2/1908  Lancia .................................. 184/33
3,302,752  2/1967  Shiokawa ........................... 184/6.28

FOREIGN PATENT DOCUMENTS 1,283,042  11/1968  Germany ......................... 184/27 R
245,409  1/1926  United Kingdom ................ 184/33
801,667  9/1958  United Kingdom ......... 123/139 BD

*Primary Examiner*—Richard C. Pinkham
*Assistant Examiner*—Arnold W. Kramer
*Attorney, Agent, or Firm*—Cushman, Darby & Cushman

[57] ABSTRACT

A lubricating oil pump comprising a plunger slidably and rotatably fitted in a cylinder chamber and having a worm wheel at one end and a lead portion at the other end thereof and arranged to form a pump chamber by means of a part of said cylinder chamber and said lead portion, said lubricating oil pump thereby providing comparatively large delivery in spite of the fact it can be manufactured at a low cost and is small in size.

The lubricating oil pump further comprises an annular groove formed at a middle portion of the plunger and an eccentric cam, which is operable from outside, projecting into said annular groove and displaceable in thrust direction of the plunger so that the plunger stroke can be varied.

5 Claims, 14 Drawing Figures

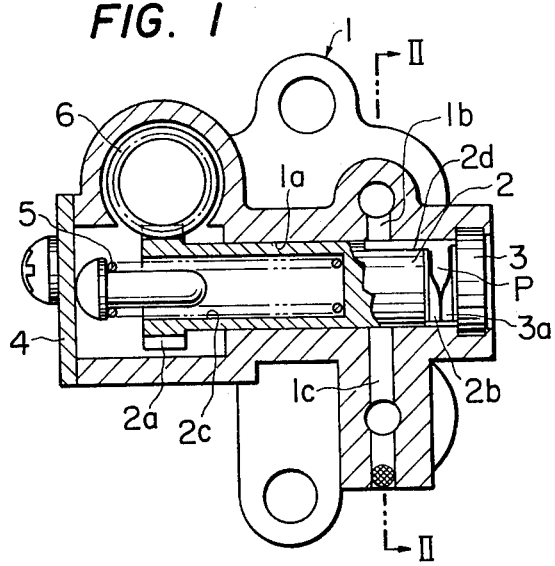
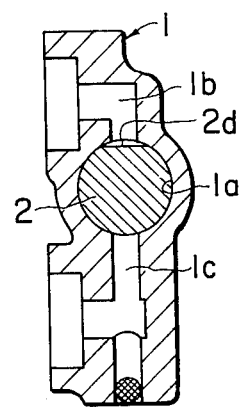
FIG. 1
FIG. 2
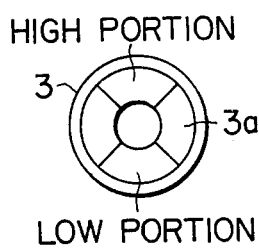
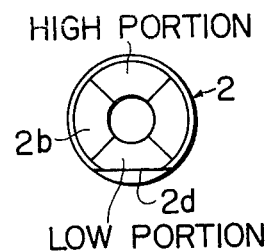
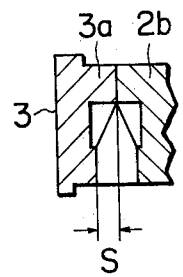
FIG. 3
FIG. 4
FIG. 5
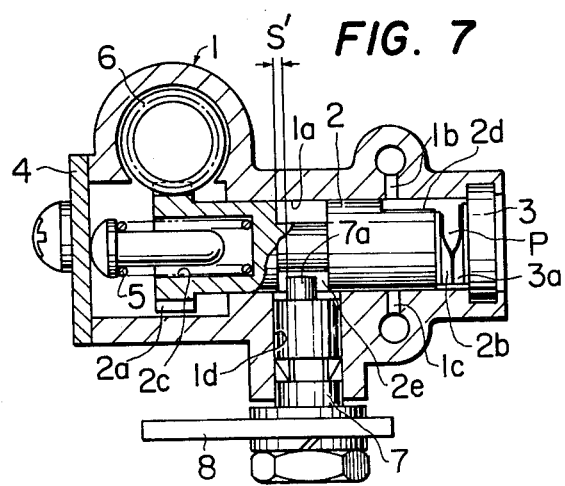
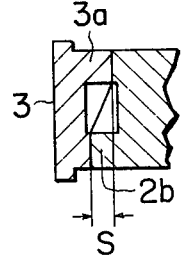
FIG. 7
FIG. 6

LUBRICATING OIL PUMP

BACKGROUND OF THE INVENTION a. Field of the invention

The present invention relates to a lubricating oil pump and, more particularly, to a plunger-type lubricating oil pump.

b. Description of the prior art

Some of known plunger-type lubricating oil pumps are arranged so that the delivery varies in proportion to rotational speed of the plunger and others are arranged so that the delivery can be controlled by adjusting operation from the outside. In the former type of pumps, a lead portion for giving reciprocating movement to the plunger and a pump chamber are formed at positions separate from each other. In the latter type of pumps, a delivery control means is arranged at one end of the plunger and the pump chamber is arranged on the other end. Both types of pumps therefore have disadvantages that the cost of production is comparatively high and, moreover, that the pump as a whole becomes large in size compared with its delivery.

SUMMARY OF THE INVENTION

It is, therefore, a primary object of the present invention to provide a plunger-type lubicating oil pump which is small in size and can be manufactured at low cost.

Another object of the present invention is to provide a plunger- type lubricating oil pump having high pumping efficiency.

According to the present invention, the above objects can be attained by providing a driving gear at one end of the plunger, which is slidably and rotatably fitted in a cylinder chamber of a pump body, and a lead portion at the other end thereof and by pushing said lead portion against a projected portion of a guide plate fixed to the pump body, a pump chamber being thus formed by said cylinder chamber, end portion of the plunger where the lead portion is formed and said guide plate.

These and other objects of the present invention will become more apparent during the course of the following detailed description and appended claims.

BRIEF DESCRIPTION OF THE DRAWINGS

FIG. 1 shows a sectional view illustrating an embodiment of the lubricating oil pump according to the present invention;

FIG. 2 shows a sectional view taken along the line II—II in FIG. 1;

FIG. 3 shows a front view of the lead portion formed on the guide plate of the embodiment shown in FIG. 1;

FIG. 4 shows a front view of the projected portion formed on the plunger of the embodiment shown in FIG. 1;

FIGS. 5 and 6 respectively show partial sectional views illustrating different states of engagement of the projected portion and lead portion of the embodiment shown in FIG. 1;

FIG. 7 shows a sectional view illustrating another embodiment of the lubricating oil pump according to the present invention;

DESCRIPTION OF THE PREFERRED EMBODIMENTS

Figure 8:
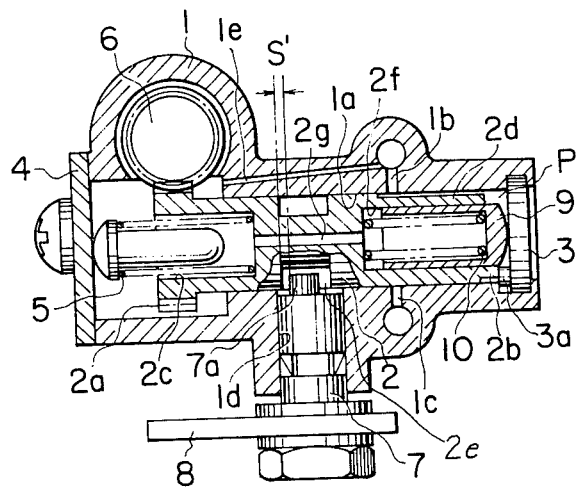
FIG. 8 shows a sectional view illustrating still another embodiment of the lubricating oil pump according to the present invention.
Figure 9:
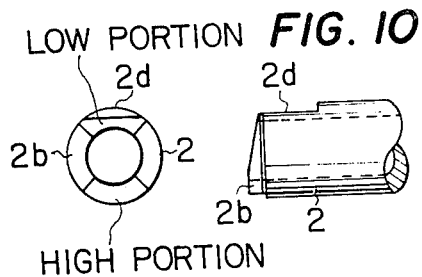
FIGS. 9 and 10 respectively show a front view and side view of the end portion of the plunger of the embodiment shown in FIG. 8.
Figure 10:
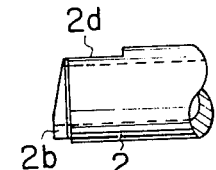
Figures 11, 12:
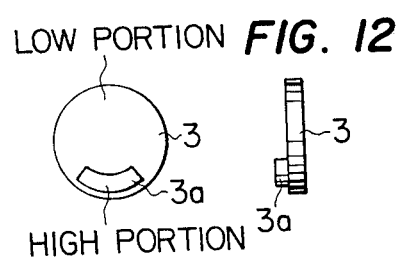
FIGS. 11 and 12 respectively show a front view and side view of the projected portion formed on the guide plate of the embodiment shown in FIG. 8.
Figure 13:
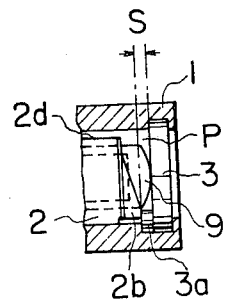
FIGS. 13 and 14 respectively show partially broken sectional views illustrating different states of engagement of the projected portion and lead portion of the embodiment shown in FIG. 8.
Figure 14:
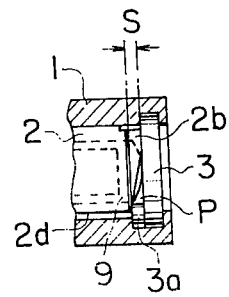

First referring to FIGS. 1 and 2, reference numeral 1 designates a pump body having a cylinder 1a and a suction port 1b and delivery port 1c respectively provided in radial direction of the cylinder chamber 1a. Numeral 2 designates a plunger slidably and rotatably fitted in said cylinder chamber 1a and having worm wheel 2l functioning as a driving gear at one end thereof, a lead portion 2b (refer to FIG. 4) at the other end thereof, a blind hole 2c at the center portion thereof and a cut- off portion 2d, which is communicatable to said suction port 1b and delivery port 1c, at the end portion thereof where said lead portion 2b is formed. Numeral 3 designates a guide plate having on one face thereof a projected portion 3a, as shown in FIG. 3, engageable with said lead portion 2b and fixed to the pump body 1 so that said guide plate 3 seals an open end of said cylinder chamber 1a. Numeral 4 designates a cover member fixed to the pump body 1 for sealing the other open end of the cylinder chamber 1a. Numeral 5 designates a spring inserted into the blind hole 2c of the plunger 2 and arranged to push said plunger 2 rightward as seen in FIG. 1. Numeral 6 designates a worm rotatably mounted to the pump body 1 and intermeshing with the worm wheel 2a. In the above case, the guide plate 3 is fixed at a pre-determined position, i.e., in the relative position in which the cut-off portion 2d of the plunger 2 is communicated to the suction port 1b at the same time when the lead portion 2b gets onto the projected portion 3a by engaging with said projected portion 3a. Besides, it is so arranged that a pump chamber P is formed by means of the cylinder chamber 1a, plunger 2 and guide plate 3.

Operation of the above-mentioned plunger pump is as described below.

When the plunger 2 is rotated through the worm 6 and worm wheel 2a, the relative position of the lead portion 2b and projected portion 3a alternately changes as respectively shown in FIG. 5 and FIG. 6 at every half rotation of the plunger 2. As a result, the plunger 2 is reciprocated rightward and leftward, as seen in FIG. 1, by the stroke equal to the difference in height of the high portion and low portion of the projected portion 3a , i.e., the stroke shown by reference symbol S in FIG. 5 and FIG. 6. Therefore, capacity of the pump chamber P also repeats increase and decrease every time when the plunger 2 completes one rotation. In the increasing stroke of said capacity, the cut-off portion 2d is communicated to the suction port 1b and fluid such as oil is sucked into the pump chamber P. In the decreasing stroke, said cut-off portion 2d is communicated to the delivery port 1c and fluid is delivered from the pump chamber P.

In the above, the present invention is described referring to an embodiment in which the present invention is applied to an lubricating oil pump of such type that its delivery varies in proportion to rotational speed of the plunger 2. Now, referring to FIG. 7, another embodiment is described below in which a delivery control mechanism is additionally provided to the above-mentioned type of pump arranged so that its delivery is varied in proportion to its rotational speed. That is, in the embodiment shown in FIG. 7, a control pin chamber 1d, which intersects at a right angle with the cylinder chamber 1a is provided at the middle portion of the pump body 1. Besides, an annular groove 2e is formed at the middle portion of the plunger 2. In the control pin chamber 1d, a control pin 7 is rotatably inserted in liquid-tight state. An eccentric cam 7a formed at the extreme end of said pin 7 projects into said annular groove 2e of the plunger 2. At the other end of the control pin 7 projecting to the outside of the pump body, an operating lever 8 is fixed. When the control pin 7 is rotated by means of the operating lever 8, the eccentric cam 7a moves in the annular groove 2e and, consequently, the distance S' between the side face of the annular groove 2e and peripheral surface of the eccentric cam is adjusted arbitrarily.

When, therefore, the eccentric cam 7a is moved leftward in FIGS. 7 by operation of the operating lever 8, said distance S' becomes smaller than the stroke S of the plunger 2, the side face of the annular groove 2e engages with the eccentric cam 7a before the plunger 2 completes its whole stroke in its rightward movement from the position shown in FIG. 7. As a result, the stroke of the plunger 2 is limited by the distance S' delivery of the pump is changed.

Still another embodiment shown in FIG. 8 differs from the embodiment shown in FIG. 7 in the following points. That is, unlike the embodiment shown in FIG. 7, another hole 2f is provided at the end of the plunger 2 which is opposite to the end thereof where the hole 2c is provided. Besides, a differential plunger 9 biased by a spring 10 so that it is projectable into the pump chamber P is fitted in the hole 2f. Bottoms of two holes 2c and 2f are communicated to each other by a passage 2g formed in the inside of the plunger 2. Besides, the chamber in the pump body 1 accommodating the driving gear 2a is communicated to the suction port 1b by means of passage 1e formed in the pump body. Furthermore, it should be noted that the force of the spring 10 is weaker than the force of the spring 5.

As function of the embodiment shown in FIG. 8 can be easily understood from the description given in relation to embodiments shown in FIG. 1 and FIG. 7, detailed explanation is omitted. Here, however, it should be noted that presence of the differential plunger 9 contributes to reduction of weight of the plunger 2 and, moreover, provides possibility of arbitrarily varying the capacity of the pump chamber P.

As it is evident from respective embodiments of the present invention described in the above, the plunger 2 can be formed by sintering and, therefore, it is very advantageous from the view point of the cost of production as the number of processes in the manufacture is remarkably reduced compared with lubricating oil pumps of known structure.

We claim:

1. A lubricating oil pump comprising:
    a pump body having a cylinder chamber therein;
    a plunger rotatably and slidably fitted in said cylinder chamber and having a driving gear at one end and a lead portion at the other end thereof;
    a guide plate fixed to said pump body in order to seal an open end of said cylinder chamber and having a projected portion engageable with said lead portion in order to give a stroke to said plunger;
    a spring inserted in said plunger, pushing against said pump body and biasing said plunger in order to push said lead portion against said projected portion;
    said lubricating oil pump being arranged to form a pump chamber by means of said cylinder chamber, the end portion of said plunger where said lead portion is formed and said guide plate;
    a cut-off portion formed at the end of said plunger where said lead portion is formed;
    said pump chamber being communicatable to a suction port and delivery port of said pump chamber through said cut-off portion; and
    a gear meshed with said driving gear for powering the pump.

2. A lubricating oil pump according to the claim 1, in which said lead portion and said projected portion have shape and size same as each other.

3. A lubricating oil pump according to the claim 1, in which a hole is formed at the end of said plunger where said lead portion is formed, the bottom portion of said hole being communicated to the suction port of said pump chamber, said hole accommodating a differential plunger biased to engage with said guide plate and slidably fitted into said hole.

4. A lubricating oil pump according to the claim 1 further comprising an annular groove formed at a middle portion of said plunger, a control pin chamber formed in said pump body so as to intersect with said cylinder chamber at a right angle, and a control pin rotatably fitted into said control pin chamber in liquid-tight state and having an eccentric cam projecting into said annular groove, said eccentric cam being rotated through said control pin for the purpose of varying the stroke of said plunger and thereby controlling delivery of said lubricating oil pump.

5. A lubricating oil pump according to the claim 4, in which a hole is formed at the end of the said plunger where said lead portion is formed, the bottom of said hole being communicated to the suction port of said pump, said hole accommodating a differential plunger biased to engage with said guide plate and slidably fitted into said hole.

* * * * *